United States Patent
Wiechers et al.

(10) Patent No.: US 11,250,678 B2
(45) Date of Patent: Feb. 15, 2022

(54) AVERTING A DANGER

(71) Applicants: Ralph Wiechers, Mayschoß (DE); Christian Ibach, Bonn (DE)

(72) Inventors: Ralph Wiechers, Mayschoß (DE); Christian Ibach, Bonn (DE)

(73) Assignee: Deutsche Post AG, Bonn (DE)

( * ) Notice: Subject to any disclaimer, the term of this patent is extended or adjusted under 35 U.S.C. 154(b) by 473 days.

(21) Appl. No.: 15/787,449

(22) Filed: Oct. 18, 2017

(65) Prior Publication Data

US 2018/0114422 A1 Apr. 26, 2018

(30) Foreign Application Priority Data

Oct. 20, 2016 (DE) .................... 10 2016 120 060.3

(51) Int. Cl.
*G08B 13/00* (2006.01)
*G08B 13/196* (2006.01)
(Continued)

(52) U.S. Cl.
CPC ....... *G08B 13/19647* (2013.01); *G08B 13/00* (2013.01); *G08B 13/196* (2013.01);
(Continued)

(58) Field of Classification Search
CPC .... H04W 4/90; H04W 76/50; G06Q 10/0635; G06Q 50/265; G08B 21/02;
(Continued)

(56) References Cited

U.S. PATENT DOCUMENTS

| 8,245,928 B2 | 8/2012 | Warren |
| 2004/0030451 A1 | 2/2004 | Solomon |

(Continued)

FOREIGN PATENT DOCUMENTS

| CN | 102471040 A | 5/2012 |
| CN | 106005451 A | 10/2016 |
| WO | WO 2009/147663 A2 | 12/2009 |

OTHER PUBLICATIONS

Azarm et al., Conflict-Free Motion of Multiple Robots Based on Decentralized Motion Planning and Negotiation, Proceedings of International Conference on Robotics and Automation, Apr. 1997, 8 pages, vol. 4, IEEE Conference Publications.
(Continued)

*Primary Examiner* — Benyam Haile
(74) *Attorney, Agent, or Firm* — Reinhart Boerner Van Deuren P.C.

(57) ABSTRACT

Provided are embodiments of a method for averting a danger performed by a control apparatus. The method involves a step of obtaining a plurality of pieces of sensor information. At least partially depending on the obtained pieces of sensor information, it is determined whether a danger exists. A support offer request message is transmitted if it is determined that the danger exists. At least one first support offer message is received from a first support apparatus in response to the support offer request message. At least partially depending on the received first support offer message, it is determined whether a first support measure of the first support apparatus is suitable for averting the danger. The first support measure is then prompted if it is determined that the first support measure is suitable for averting the danger.

21 Claims, 4 Drawing Sheets

(51) Int. Cl.
      *G08B 15/00*     (2006.01)
      *H04W 4/90*      (2018.01)
      *G08B 21/02*     (2006.01)

(52) U.S. Cl.
      CPC .............. *G08B 15/00* (2013.01); *H04W 4/90* (2018.02); *G08B 13/19697* (2013.01); *G08B 21/02* (2013.01)

(58) Field of Classification Search
      CPC ............. G08B 25/016; G08B 25/006; G08B 21/0211; G08B 21/0243; G08B 13/00; G08B 13/19647; G08B 15/00
      See application file for complete search history.

(56) References Cited

U.S. PATENT DOCUMENTS

| | | | |
|---|---|---|---|
| 2005/0057361 A1* | 3/2005 | Giraldo | A61B 5/0062 340/573.1 |
| 2006/0038678 A1 | 2/2006 | Avneri | |
| 2015/0289122 A1* | 10/2015 | Friesen | H04W 4/02 455/404.2 |
| 2016/0071418 A1* | 3/2016 | Oshida | B60W 30/165 701/23 |
| 2016/0202702 A1 | 7/2016 | Bruemmer et al. | |
| 2017/0303187 A1* | 10/2017 | Crouthamel | H04W 4/80 |
| 2018/0059688 A1* | 3/2018 | Benraz | G05D 1/0088 |

OTHER PUBLICATIONS

Fong et al., "Robot, asker of questions," Robotics and Autonomous Systems, 2003, 10 pages, Elsevier Science B.V.

* cited by examiner

AVERTING A DANGER

CROSS-REFERENCE TO RELATED PATENT APPLICATION

This patent application claims priority to German Application No. 10 2016 120 060.3, filed Oct. 20, 2016, the entire teachings and disclosure of which are incorporated herein by reference thereto.

FIELD

Exemplary embodiments of the invention relate to a method for averting a danger and/or for prompting the averting of a danger. A control apparatus, a computer program and a system are further disclosed.

BACKGROUND

The prior art discloses, inter alia, unmanned vehicles having a receiving compartment for transporting one or more shipments. These unmanned vehicles may be exposed to different dangers during transport of the shipment, for example possible theft of the shipment. However, on account of the restricted installation space and the limited complexity of the unmanned vehicles, it is not possible to equip these vehicles with suitable means for averting all of these dangers, with the result that, in the event of a danger, it is often not possible to successfully avert this danger.

SUMMARY OF SOME EXEMPLARY EMBODIMENTS OF THE INVENTION

The object of the present invention is therefore, inter alia, to overcome these problems.

The invention discloses a method for averting a danger and/or for prompting the averting of a danger, wherein the method is at least partially performed by a control apparatus, and wherein the method comprises the following:
  obtaining a plurality of pieces of sensor information;
  determining, at least partially depending on the obtained pieces of sensor information, whether a danger exists;
  transmitting and/or causing the transmitting of a support offer request message if it is determined that the danger exists;
  receiving and/or causing the receiving of at least one first support offer message from a first support apparatus in response to the support offer request message;
  determining, at least partially depending on the received first support offer message, whether a first support measure of the first support apparatus is suitable for averting the danger; and
  prompting the first support measure if it is determined that the first support measure is suitable for averting the danger.

The invention further discloses a control apparatus, wherein the control apparatus comprises means configured to perform the method according to the invention or respective means for performing the steps of the method according to the invention.

In this case, different steps can be optionally performed by different means.

The means of the control apparatus according to the invention may comprise hardware and/or software components. The means may comprise, for example, at least one memory containing program instructions of a computer program (for example of the computer program according to the invention) and at least one processor configured to execute program instructions from the at least one memory. Accordingly, a control apparatus comprising at least one processor and at least one memory containing program instructions is also intended to be understood as having been disclosed according to the invention, wherein the at least one memory and the program instructions are configured, together with the at least one processor, to prompt the control apparatus to perform the method according to the invention.

Alternatively or additionally, the means may further comprise one or more communication interfaces (for example one or more wireless and/or wired network adapters) and/or one or more sensors. It goes without saying that the control apparatus may also comprise other means which have not been listed.

The control apparatus according to the invention is, for example, a control apparatus for averting a danger and/or for prompting the averting of a danger.

The invention further discloses a system, wherein the system comprises at least one control apparatus according to the invention and one or more support apparatuses.

The invention further discloses a computer program, wherein the computer program comprises program instructions which are configured, when executed by at least one processor, to prompt an apparatus (for example the control apparatus according to the invention) to perform the method according to the invention.

The computer program according to the invention is included and/or stored on a computer-readable storage medium, for example. A computer-readable storage medium is intended to be understood as meaning, for example, a physical and/or tangible storage medium.

The features of the method according to the invention, the control apparatus according to the invention, the system according to the invention and the computer program according to the invention are described below, partially by way of example.

One piece of sensor information represents, for example, an environment property captured by a sensor at the position of the sensor (for example a measured value of a physical or chemical variable capturable at the position of the sensor). The pieces of sensor information represent, for example, environment properties captured by different sensors (for example by at least two different sensors).

For example, the pieces of sensor information may be at least partially obtained by capturing one or more environment properties by means of one or more sensors of the control apparatus. Alternatively or additionally, the pieces of sensor information may also be at least partially obtained by receiving the pieces of sensor information by means of a wireless and/or wired communication interface of the control apparatus.

A danger is intended to be understood as meaning, for example, that there is a particular probability (for example more than 50%, preferably more than 75%, particularly preferably more than 90%) of damage (for example functional destruction and/or functional impairment) and/or unauthorized use (for example theft) of a protected good. The determining whether a danger exists, at least partially depending on the obtained pieces of sensor information, accordingly reveals, for example, that a danger exists if the obtained pieces of sensor information reveal that there is a particular probability of damage and/or unauthorized use of the protected good. For example, it is possible to predetermine for particular pieces of sensor information that, if said pieces of information are obtained, there is a particular probability of damage and/or unauthorized use of the protected good.

Danger information, for example, is obtained as the result of determining whether a danger exists. As disclosed in detail below, the danger information is indicative of the location of the danger, the time of the danger and/or the type of danger, for example.

The support offer request message is configured, for example, to prompt support apparatuses which receive the support offer request message to offer possible support measures for averting the danger in the form of a support offer message.

The support offer request message is transmitted, for example according to a wireless communication technology, if it is determined that the danger exists. The support offer request message is transmitted, for example, by means of a wireless communication interface of the control apparatus. The causing of the transmitting of the support offer request message is intended to be understood as meaning, for example, that a wireless communication interface is controlled to transmit the support offer request message.

For example, the support offer request message is transmitted in the form of a broadcast message according to a wireless communication technology (for example a local radio network technology). This is advantageous, for example, in order to also be able to communicate the support offer request message to unknown support apparatuses which are in the transmission range of the wireless communication interface of the control apparatus.

One example of a wireless communication technology is a local radio network technology such as Radio Frequency Identification (RFID) and/or Near Field Communication (NFC) and/or Bluetooth (for example Bluetooth Version 2.1 and/or 4.0) and/or Wireless Local Area Network (WLAN). RFID and NFC are specified, for example, according to the ISO standards 18000, 11784/11785 and the ISO/IEC standard 14443-A and 15693. The Bluetooth specifications are currently available on the Internet at www[dot]Bluetooth[dot]org. WLAN is specified, for example, in the standards of the IEEE 802.11 family. Another example of a wireless communication technology is a trans-regional radio network technology, for example a mobile radio technology, for example the Global System for Mobile Communications (GSM) and/or Universal Mobile Telecommunications System (UMTS) and/or Long Term Evolution (LTE). The GSM, UMTS and LTE specifications are maintained and developed by the 3rd Generation Partnership Project (3GPP) and are currently available on the Internet, inter alia, at www[dot]3gpp[dot]com. In some exemplary embodiments of the invention, a wireless communication technology is also intended to be understood as meaning a broadcast technology, for example DAB (Digital Audio Broadcasting) and/or DMB (Digital Multimedia Broadcasting). The DAB standard is available online from the European Telecommunications Standards Institute (ETSI) under the code EN 300 401, for example.

Optical and/or acoustic communication technologies are another example of a wireless communication technology. An optical communication technology is based, for example, on the transmission of pieces of information by means of optical signals such as infrared signals, laser signals and/or flash patterns. The specifications (for example IrPHY, IrLAP or IrMC) developed and maintained by the Infrared Data Association and currently available on the Internet at www[dot]irda[dot]org, inter alia, are optical communication technologies, for example. Acoustic communication technologies are accordingly based, for example, on the transmission of pieces of information by means of acoustic signals such as ultrasonic signals and/or audible noise or signal patterns (for example as a result of modulation of a carrier wave with an audible or inaudible fundamental frequency, for example in the audible sound or ultrasonic frequency range). Acoustic signals may be transmitted both as analog signals and as digital signals.

It goes without saying that the support offer request message may also be alternatively or additionally transmitted according to a wired communication technology if it is determined that the danger exists. The support offer request message is transmitted, for example, by means of a wired communication interface of the control apparatus.

One example of a wired communication technology is a local network technology such as Ethernet and/or Universal Serial Bus (USB, for example USB Version 2.0 and/or 3.0). Ethernet is specified, for example, in the standards of the IEEE 802.3 family. The USB specifications are currently available on the Internet, inter alia, at www [dot]usb [dot] org. Trans-regional transmission standards such as Integrated Services Digital Network (ISDN) and/or Digital Subscriber Line (DSL) are another example of a wired communication technology. The DSL specifications were at least partially developed by the ITU-T (for example ADSL, ADSL+, VDSL1 and VDSL2) and are currently available on the Internet, inter alia, at www[dot]itu[dot]int. ISDN was likewise developed by the ITU-T.

The first support offer message is received, for example according to a wireless or wired communication technology (for example according to the communication technology which was used to transmit the support offer request message), from the first support apparatus in response to the support offer request message. The first support offer message is received, for example, by means of a wireless or wired communication interface of the control apparatus. The causing of the receiving of the support offer message is intended to be understood as meaning, for example, that a wireless communication interface is controlled to receive the support offer message.

The first support offer message is indicative of the first support measure of the first support apparatus, for example. In this case, the first support measure of the first support apparatus is intended to be understood as meaning, for example, a support measure which is performable by the first support apparatus. For example, the first support apparatus is configured to perform the first support measure.

A support measure is, for example, an action and/or a sequence of a plurality of actions.

A danger can be averted, for example, by means of a support measure which reduces the probability of damage and/or unauthorized use of the protected good. Accordingly, the determining whether the first support measure is suitable for averting the danger may reveal that the first support measure is suitable for averting the danger if the first support measure reduces the probability of damage and/or unauthorized use of the protected good. For example, it is possible to predetermine for particular support measures that the latter reduce the probability of damage and/or unauthorized use of the protected good (for example for one or more types of danger).

If the control apparatus is part of an unmanned vehicle, the protected good may be, for example, the unmanned vehicle and/or a shipment transported by the unmanned vehicle. A danger may be present in this example if there is a particular probability (for example more than 50%, preferably more than 75%, particularly preferably more than 90%) of theft of a shipment transported by the unmanned vehicle. The probability of such theft may be reduced, for example, by means of a support measure in the form of video and/or image monitoring of the unmanned vehicle. For example, the possible thief could notice the video and/or image monitoring and could therefore desist from his intention.

Alternatively, the protected good may be, for example, a building and/or a shipment in the building if the control apparatus is part of a building automation system and/or an alarm system. In this example, a danger may be present if there is a particular probability (for example more than 50%, preferably more than 75%, particularly preferably more than 90%) of a break-in into the building. The probability of such a break-in may also be reduced, for example, by means of a support measure in the form of video and/or image monitoring of the building.

The prompting of the first support measure is intended to be understood as meaning, for example, that the control apparatus prompts the first support apparatus to perform the first support measure.

In order to avert a danger, the control apparatus can therefore not only access means of the control apparatus (or, for example, of an unmanned vehicle, part of which is the control apparatus) but can also prompt support measures of the first support apparatus which differs from the control apparatus and is coincidentally in the vicinity, for example. The present invention therefore enables a flexible and situation-dependent response to a danger without increasing the complexity of the control apparatus (or, for example, of an unmanned vehicle, part of which is the control apparatus).

In exemplary embodiments of the invention, the method is performed by the control apparatus.

Alternatively or additionally, provision may also be made for the control apparatus to prompt one or more apparatuses different from the control apparatus (for example the first support apparatus and/or a plurality of support apparatuses and/or a remote server apparatus) to perform at least some steps of the method. For example, a plurality of support apparatuses could coordinate their support measures with one another.

For example, the determining, at least partially depending on the received first support offer message, whether a first support measure of the first support apparatus is suitable for averting the danger, and/or the prompting of the first support measure if it is determined that the first support measure is suitable for averting the danger, can be performed by an apparatus which differs from the control apparatus. For example, the first support apparatus may perform these steps. Alternatively or additionally, a plurality of support apparatuses may perform these steps together in the form of a negotiation and, for example, may determine together whether and which support measure is suitable for averting the danger. It goes without saying that the steps may further also be performed by a remote server apparatus (for example a server apparatus in a control center).

This is advantageous, for example, in order to relieve the load on a processor of the control apparatus (for example if the control apparatus is damaged and/or has a lower processor power than the apparatus which differs from the control apparatus).

In exemplary embodiments of the invention, the pieces of sensor information originate from one or more sensors (for example from a plurality of different sensors). For example, the pieces of sensor information are intended to be understood as originating from one or more sensors if the pieces of sensor information are provided by these sensors and/or represent environment properties captured by these sensors.

For example, the pieces of sensor information originate from one or more of the following sensors: a temperature sensor (for example a thermometer, a thermocouple and/or a temperature-sensitive resistor), a pressure sensor, a brightness sensor, a motion sensor (for example a motion detector), an acoustic sensor (for example a microphone and/or a noise sensor), an ultrasonic sensor, an optical sensor, an infrared sensor, a light sensor (for example a photodiode and/or a photoresistor), an image sensor (for example an image camera, a CMOS sensor and/or a CCD sensor), a video sensor (for example a video camera, a CMOS sensor and/or a CCD sensor), a chemical sensor (for example a gas sensor), a glass breakage sensor, a motion sensor, a radio sensor (for example a wireless communication interface and/or a WLAN, NFC and/or Bluetooth sensor), a position sensor (for example a GPS sensor), a door and/or window opening sensor (for example a contact sensor) and/or an acceleration sensor.

In exemplary embodiments of the invention, the determining whether a danger exists is carried out according to one or more predetermined rules and/or according to a pattern recognition algorithm and/or according to a machine learning algorithm.

If particular pieces of sensor information are obtained, the predetermined rules may predetermine that a danger exists, for example. The rules may further predetermine what type of danger it is if it is determined that a danger exists.

The pattern recognition may be static pattern recognition, for example. For example, a probability of a danger existing is determined in this case for the obtained pieces of sensor information. For example, a probability of no danger existing is further determined for the obtained pieces of sensor information. For example, the determining whether a danger exists reveals that a danger exists only when the probability of a danger existing is higher than the probability of no danger existing. In addition, the probabilities of different types of dangers may be determined, for example, in order to be able to determine the type of danger. Pattern recognition algorithms are at least partially based, for example, on an artificial neural network, a Support Vector Machine, a cluster analysis or a combination of a plurality (for example all) of these techniques.

The machine learning can be carried out, for example, in the form of supervised machine learning. In the case of supervised machine learning, the result of determining whether a danger exists is monitored in a learning phase, for example by comparing the obtained pieces of sensor information with pieces of reference sensor information, and the algorithm is adapted in order to minimize a deviation of the result from a reference result assigned to pieces of reference sensor information corresponding to the obtained pieces of sensor information. For example, the reference results predetermine the result of determining whether a danger exists and/or what type of danger it is for particular pieces of reference sensor information. The pieces of reference sensor information and reference results may originate from one or more other control apparatuses, for example, or may be obtained by means of tests. Machine learning algorithms may likewise be at least partially based on an artificial neural network, a Support Vector Machine, a cluster analysis or a combination of a plurality (for example all) of these techniques.

In exemplary embodiments of the invention, the support offer request message contains pieces of danger information relating to the danger, in particular relating to the location of the danger, the time of the danger and/or the type of danger. The pieces of danger information are indicative of the location of the danger, the time of danger and/or the type of danger, for example.

The pieces of danger information are at least partially obtained, for example, as the result of determining whether a danger exists and/or are determined if it is determined that a danger exists.

The pieces of danger information therefore inform the support apparatuses, which receive the support offer request message, of what is required, where it is required and when it is required, for example. This is advantageous, for example, so that support apparatuses which receive the support offer request message can determine whether they can offer a support measure for averting the danger.

In exemplary embodiments of the invention, the support offer message contains pieces of support information relating to a possible support measure of the first support apparatus, in particular relating to the position of the first support apparatus, the time of the support measure and/or the type of support measure. The pieces of support information are indicative of the position of the first support apparatus, the time (for example the predicted earliest time) of the first support measure and/or the type of first support measure, for example. The pieces of support information may further also be indicative of an effectiveness (for example a predicted effectiveness) of the first support measure.

For example, the determining whether the first support measure is suitable for averting the danger is at least partially carried out depending on the pieces of support information.

The pieces of support information inform the control apparatus of which support measures are available, how quickly the support measure is available, where the support measure can be carried out and how effective the support measure is, for example. This is advantageous, for example, for determining the suitability of a support measure for averting the danger.

In exemplary embodiments of the invention, the determining whether the first support measure is suitable for averting the danger is carried out according to one or more predetermined rules and/or according to a pattern recognition algorithm and/or according to a machine learning algorithm.

The predetermined rules may predetermine, for example, whether and under what conditions a particular support measure is suitable for averting a particular type of danger. In addition to the type of support measure, the position of the support apparatus and/or the time of the first support measure may also be taken into account in this case, for example.

The pattern recognition is likewise a static pattern recognition as disclosed above, for example. Within the scope of pattern recognition, it is possible to determine, for example, a probability of the first support measure reducing the probability of damage and/or unauthorized use of the protected good. Furthermore, the probability of the first support measure not reducing the probability of damage and/or unauthorized use of the protected good is determined, for example. For example, the determining whether the first support measure is suitable for averting the danger reveals that it is suitable only when the probability of the first support measure reducing the probability of damage and/or unauthorized use of the protected good is higher than the probability of the first support measure not reducing the probability of damage and/or unauthorized use of the protected good.

The machine learning can also be carried out, for example for determining whether the first support measure is suitable for averting the danger, in the form of supervised machine learning, as disclosed above.

In exemplary embodiments of the invention, the first support apparatus is different from the control apparatus and/or is at least partially autonomous.

An at least partially autonomous apparatus is intended to be understood as meaning, for example, an apparatus which at least partially self-controls itself For example, a support apparatus is an unmanned vehicle which can move in an at least partially autonomous manner. An unmanned vehicle is intended to be understood as meaning, for example, an aircraft, a watercraft and/or a land vehicle. A support apparatus in the form of an unmanned vehicle is, for example, a mobile robot (for example a storage robot) and/or a drone (for example an air drone).

An air drone, as a support measure, may fly to the location of the danger, for example, and may film and/or identify a possible attacker (for example a thief or burglar) from a safe height using a video camera of the air drone. A storage robot, as a support measure, may block a possible escape route of an attacker and/or may enable a user (for example an operator) to communicate with the attacker, for example.

It goes without saying that a support apparatus may also be stationary. One example of a stationary support apparatus is a pivotable monitoring camera which is configured to automatically monitor a particular pivoting range and to trigger an alarm if predetermined events are detected. Another example of a stationary support apparatus is an at least partially autonomous actuator of a building automation system and/or of an alarm system such as an automatic lighting system (for example a lighting system which automatically switches on and off at predetermined times) or an automatic door (for example a fire door which automatically closes when a fire is detected).

A lighting system, as a support measure, may set the light in a building to the brightest level, for example. Automatic doors, as a support measure, may close and may switch on the frame with red LEDs in order to signal "fire protection mode, permanently closed with safety bolts".

Further examples of support apparatuses are smart lights, smart cameras, smartphones, smart doorbells, smart doors, smart elevators and home automation systems.

In exemplary embodiments of the invention, the prompting of the first support measure comprises transmitting and/or causing the transmitting of a support request message to the first support apparatus. The support request message is configured, for example, to prompt the first support apparatus to perform the first support measure.

The support request message is transmitted, for example according to a wireless or wired communication technology (for example according to the communication technology which was used to receive the support offer message), to the first support apparatus. The support request message is transmitted, for example, by means of a wireless or wired communication interface of the control apparatus. The causing of the transmitting of the support request message is intended to be understood as meaning, for example, that a wireless communication interface is controlled to transmit the support request message.

In exemplary embodiments of the invention, the support offer request message and/or the support request message contain(s) support authorization information.

The support authorization information is configured, for example, to verify authorization of the control apparatus to request support (for example with respect to support apparatuses which belong to and/or are operated by the same organization and/or the same company as the control apparatus). A support apparatus performs a support measure, for example, only when the control apparatus can verify corresponding authorization.

For example, the support authorization information contains a support authorization password, a support authorization code and/or a support authorization key.

In exemplary embodiments of the invention, the support offer request message and/or the support offer message and/or the support request message is/are formed according to a predefined protocol.

In exemplary embodiments of the invention, the method further comprises the following:
  receiving and/or causing the receiving of at least one second support offer message from a second support apparatus in response to the support offer request message;
  determining, at least partially depending on the received second support offer message, whether a second support measure is suitable for averting the danger; and
  prompting the second support measure if it is determined that the second support measure is suitable for averting the danger.

The second support offer message differs from the first support offer message, and the second support apparatus differs from the first support apparatus.

The receiving and/or the causing of the receiving of the second support offer message, the determining whether the second support measure is suitable for averting the danger, and the prompting of the second support measure take place, for example, according to the steps disclosed above for the first support offer message. Accordingly, the disclosures for the first support offer message are accordingly also intended to apply to the second support offer message.

In exemplary embodiments of the invention, if a plurality of support offer messages (for example the first support offer message and the second support offer message) are received from different support apparatuses (for example the first support apparatus and the second support apparatus) in response to the support offer request message and if it is determined that a plurality of support measures of the various support apparatuses are suitable for averting the danger, at least one support measure of the various support apparatuses is prompted.

For example, for each of the support measures, it is determined whether the respective support measure is suitable for averting the danger.

For example, provision may be made for at least that support measure which is most suitable for averting the danger to be prompted. For example, the various support measures can be weighted according to their suitability for averting the danger, with the result that at least that support measure which is most suitable for averting the danger can be determined and prompted on the basis of the weighting. The weighting is obtained, for example, as the result of determining whether the respective support measure is suitable for averting the danger. For example, the weighting corresponds to the probability with which the respective support measure reduces the probability of damage and/or unauthorized use of the protected good. Furthermore, possible collateral damage can also be taken into account in the weighting. For example, of two support measures which both equally reduce the probability of damage and/or unauthorized use of the protected good, that support measure which probably causes less collateral damage can be given a higher weighting.

It goes without saying that a plurality or all of the various support measures can also be prompted. For example, it may be predetermined that all support measures or all support measures with a particular minimum weighting are prompted.

This is advantageous, for example, in order to enable a situation-dependent and flexible response to a danger.

In exemplary embodiments of the invention, the method further comprises the following:
  storing and/or prompting the storing of pieces of documentation information for documenting the danger and/or the averting of the danger.

The pieces of documentation information contain, for example, pieces of sensor information and/or pieces of information received from one or more support apparatuses. For example, the pieces of documentation information are stored in a memory of the control apparatus.

In exemplary embodiments of the invention, the method further comprises the following:
  obtaining further pieces of sensor information; and
  determining, at least partially depending on the obtained further pieces of sensor information, whether the danger still exists.

For example, the further pieces of sensor information are obtained after prompting the first support measure. The success of the first support measure can be determined on the basis of these further pieces of sensor information.

The determining, at least partially depending on the obtained further pieces of sensor information, whether the danger still exists is carried out, for example, according to the above-disclosed determining, at least partially depending on the obtained pieces of sensor information, whether a danger exists. If it is revealed that the danger no longer exists, stopping of the first support measure is prompted, for example.

In exemplary embodiments of the invention, the control apparatus is part of an unmanned vehicle and/or a building automation system and/or an alarm system.

The control apparatus is part of an unmanned vehicle, for example. For example, the control apparatus is configured to at least partially control such an unmanned vehicle. An unmanned vehicle is intended to be understood as meaning, for example, an aircraft, a watercraft and/or a land vehicle, for example an aircraft, a watercraft and/or a land vehicle which comprises means for receiving and/or transporting one or more shipments and can at least partially move in an autonomous manner. For example, the unmanned vehicle comprises at least one receiving compartment which is closable by means of a door and/or a flap and is intended to receive and transport one or more shipments. It goes without saying that the unmanned vehicle may also have a plurality of receiving compartments which are closable by means of a door and/or flap and are intended to receive and transport one or more shipments. A shipment is, for example, a package, a piece good, a parcel shipment (for example a parcel) and/or a mail shipment (for example a letter). The door and/or flap closes, for example, a housing and/or body opening of the unmanned vehicle, through which opening a receiving compartment of the vehicle is accessible. An unmanned vehicle is not intended to transport persons (for example neither to transport a driver nor to transport passengers), for example.

Alternatively or additionally, the control apparatus may also be part, for example, of a building automation system and/or an alarm system. For example, the control apparatus is configured to at least partially control such a building automation system and/or alarm system.

Further advantageous exemplary embodiments of the invention can be gathered from the following detailed description of some exemplary embodiments of the present invention, in particular in conjunction with the figures. However, the figures accompanying the application are intended to be used only for the purpose of illustration but not for the purpose of determining the scope of protection of the invention. The accompanying drawings are not necessarily true to scale and are intended to only reflect the general concept of the present invention by way of example. In particular, features which are included in the figures are in no way intended to be considered a necessary part of the present invention.

DETAILED DESCRIPTION

Figure 1:
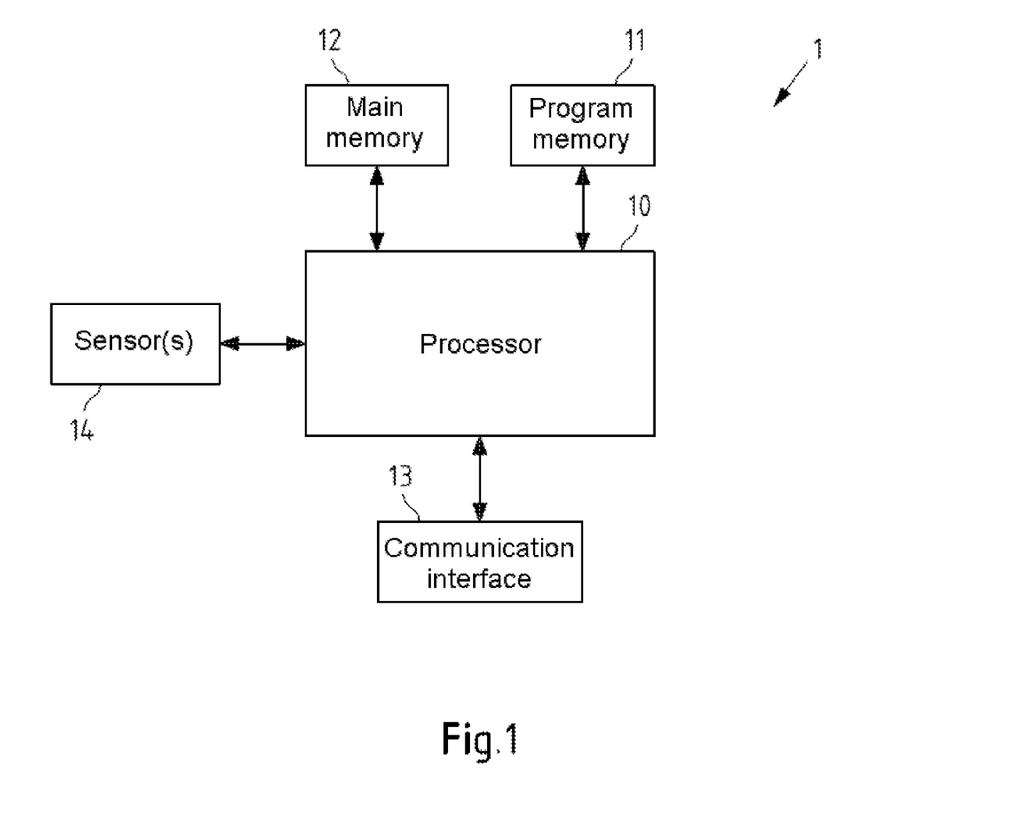
FIG. 1 shows a schematic illustration of an exemplary embodiment of a control apparatus according to the invention.

FIG. 1 is a schematic illustration of an exemplary embodiment of a control apparatus 1 according to the invention.

The control apparatus 1 comprises, for example, a processor 10 and, connected to the processor 10, a first memory as a program and data memory 11, a second memory as a main memory 12, a wireless communication interface 13 and one or more sensors 14.

A processor is intended to be understood as meaning, for example, a microprocessor, a micro-control unit, a microcontroller, a digital signal processor (DSP), an application-specific integrated circuit (ASIC) or a field programmable gate array (FPGA). It goes without saying that the control apparatus 1 may also comprise a plurality of processors 10.

Processor 10 executes program instructions, which are stored in program memory 11, and stores intermediate results or the like in main memory 12, for example. The program memory 11 contains, for example, program instructions of a computer program according to the invention which comprises program instructions which prompt the processor 10 to perform and/or control the method according to the invention (for example the method according to the flowchart 300 illustrated in FIG. 3) when the processor 10 executes these program instructions stored in program memory 11.

Program memory 11 further contains, for example, the operating system of the control apparatus 1, which operating system is at least partially loaded into main memory 12, when the control apparatus 1 is started, and is executed by the processor 10. In particular, at least one part of the core of the operating system is loaded into the main memory 12, when the control apparatus 1 is started, and is executed by processor 10.

One example of an operating system is a Windows, UNIX, Linux, Android, Apple iOS and/or MAC OS operating system. The operating system makes it possible, in particular, to use the control apparatus 1 for data processing. It manages, for example, operating means such as a main memory and a program memory, provides other computer programs with fundamental functions, inter alia by means of programming interfaces, and controls the execution of computer programs.

A program memory is, for example, a non-volatile memory such as a flash memory, a magnetic memory, an EEPROM memory (electrically erasable programmable read-only memory) and/or an optical memory. A main memory is, for example, a volatile or non-volatile memory, in particular a random access memory (RAM) such as a static RAM memory (SRAM), a dynamic RAM memory (DRAM), a ferroelectric RAM memory (FeRAM) and/or a magnetic RAM memory (MRAM).

Main memory 12 and program memory 11 may also be in the form of one memory. Alternatively, main memory 12 and/or program memory 11 may each be formed by a plurality of memories. Furthermore, main memory 12 and/or program memory 11 may also be part of the processor 10.

Processor 10 controls the wireless communication interface 13 which is in the form of a WLAN interface, for example.

A wireless communication interface can receive, for example, pieces of information (via a wireless communication path) and can forward them to the processor and/or can receive pieces of information from the processor and can transmit them (via a wireless communication path). One example of a wireless communication interface is a wireless network adapter. For example, a wireless communication interface comprises, in addition to an antenna, at least one transmitter circuit and one receiver circuit or a transceiver circuit.

Figure 2:
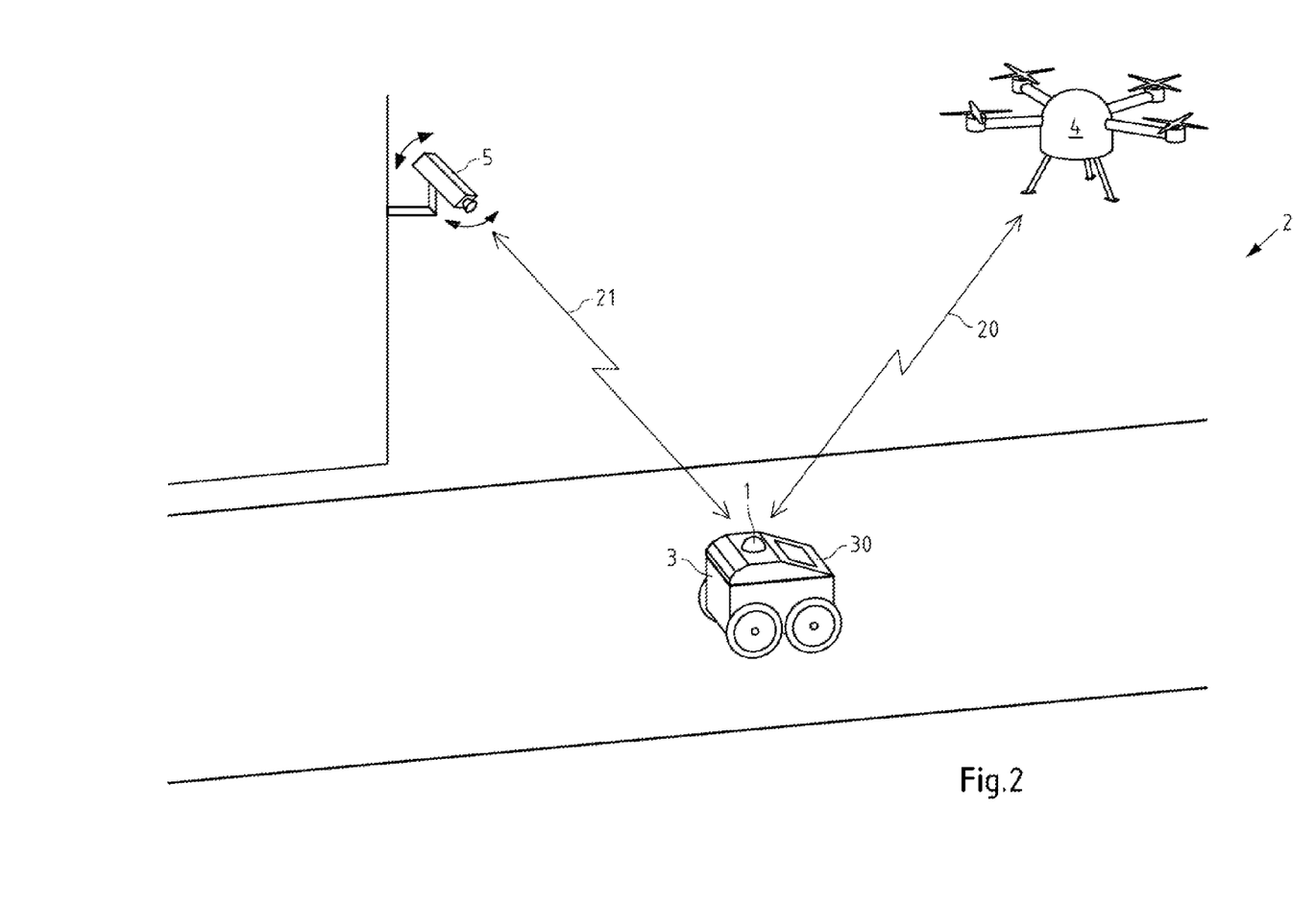
FIG. 2 shows a schematic illustration of an exemplary embodiment of a system according to the invention.

The wireless communication interface 13 is configured, for example, to communicate with one or more support apparatuses (for example the air drone 4 and/or monitoring camera 5 illustrated in FIG. 2).

In addition, control apparatus 1 has one or more sensors 14. The sensors 14 are configured, for example, to capture an environment property (for example a measured value of a physical or chemical variable capturable at the position of the sensor). Furthermore, the sensors 14 are configured, for example, to provide pieces of sensor information which represent the environment properties captured by the sensors 14. These pieces of sensor information originate from the sensors 14 and can be processed further by the processor 10, for example.

The sensors 14 comprise, for example, one or more of the following sensors: a temperature sensor (for example a thermometer, a thermocouple and/or a temperature-sensitive resistor), a pressure sensor, a brightness sensor, a motion sensor (for example a motion detector), an acoustic sensor (for example a microphone and/or a noise sensor), an ultrasonic sensor, an optical sensor, an infrared sensor, a light sensor (for example a photodiode and/or a photoresistor), an image sensor (for example an image camera, a CMOS sensor and/or a CCD sensor), a video sensor (for example a video camera, a CMOS sensor and/or a CCD sensor), a chemical sensor (for example a gas sensor), a glass breakage sensor, a motion sensor, a position sensor (for example a GPS sensor), a door and/or window opening sensor (for example a contact sensor), a fingerprint sensor and/or an acceleration sensor.

Alternatively or additionally, the sensors 14 are at least partially outside the control apparatus 1. In this case, the pieces of sensor information from the external sensors 14 can be received, for example, by the wireless communication interface 13 (or a further wired or wireless communication interface).

The components 10 to 14 of the control apparatus 1 are communicatively and/or operatively connected to one another, for example, via one or more bus systems (for example one or more serial and/or parallel bus connections).

It goes without saying that, in addition to the components 10 to 14, the control apparatus 1 may comprise further components (for example a user interface and/or a further wired or wireless communication interface).

FIG. 2 shows a schematic illustration of an embodiment of a system 2 according to the invention.

The system 2 comprises an unmanned vehicle 3 and one or more support apparatuses, for example in the form of the air drone 4 and/or the monitoring camera 5.

FIG. 2 illustrates the control apparatus 1 disclosed in connection with FIG. 1 as part of an unmanned vehicle 3, for example. The unmanned vehicle 3 is a land vehicle and has a receiving compartment 30 which is closed with a door. The unmanned vehicle 3 can transport a shipment in the receiving compartment 30. For example, the unmanned vehicle 3 is a transport drone. For example, the unmanned vehicle is configured to deliver a shipment in an at least partially autonomous manner. The control apparatus 1 is configured, for example, to control such an at least partially autonomous delivery of a shipment by the unmanned vehicle.

The air drone 4 is an unmanned aircraft and is configured, for example, to deliver a shipment in an at least partially autonomous manner. For example, the air drone 4 is a parcelcopter.

The monitoring camera 5 is configured, for example, to automatically monitor a particular pivoting range and to trigger an alarm (for example an optical and/or acoustic alarm at the position of the monitoring camera 5 and/or in a monitoring center) if predetermined events are detected.

The control apparatus 1 can communicate with the air drone 4 and/or the monitoring camera 5 by means of the wireless communication interface 13. The corresponding wireless communication paths are provided with the reference symbols 20 and 21 in FIG. 2.

Figure 3:
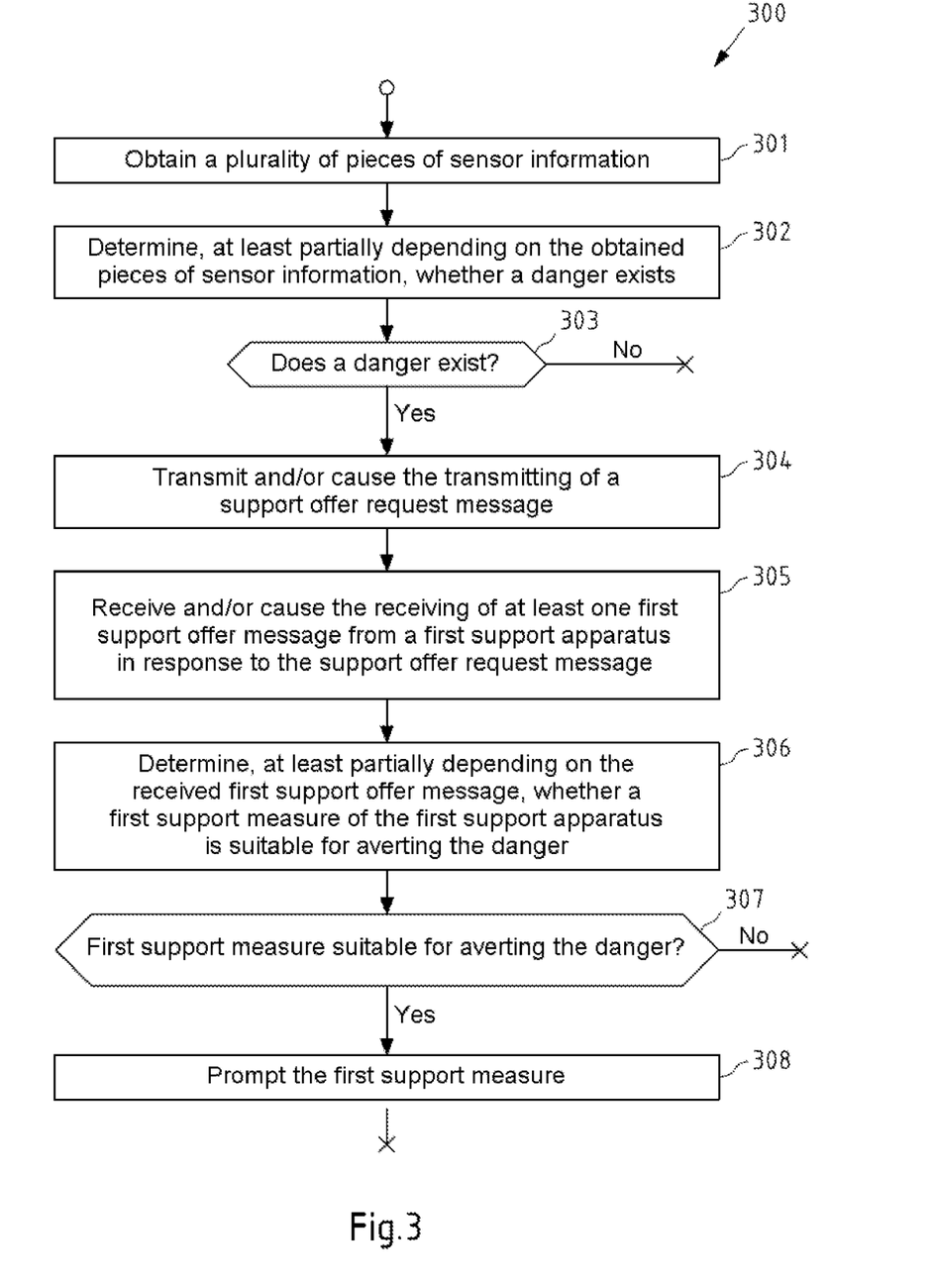
FIG. 3 shows a flowchart of an exemplary embodiment of a method according to the invention.

FIG. 3 shows a flowchart having steps of an exemplary embodiment of a method according to the invention. It is assumed by way of example below that steps 301 to 308 of the flowchart 300 are performed by the control apparatus 1 which is part of the unmanned vehicle 3 in system 2 (cf. FIG. 2).

In a step 301, a plurality of pieces of sensor information are obtained at the control apparatus 1. For example, the pieces of sensor information represent environment properties captured by the sensors 14 at the position of the unmanned vehicle 3.

In a step 302, it is determined, at least partially depending on the pieces of sensor information obtained in step 301, whether a danger exists.

As disclosed above, a danger is intended to be understood as meaning, for example, that there is a particular probability (for example more than 50%, preferably more than 75%, particularly preferably more than 90%) of damage (for example functional destruction and/or functional impairment) and/or unauthorized use (for example theft) of a protected good.

It is assumed by way of example below that the protected good is the unmanned vehicle 3 and/or a shipment transported by the unmanned vehicle 3. The determining in step 302 accordingly reveals that a danger exists, for example, if the obtained pieces of sensor information reveal that there is a particular probability of damage and/or unauthorized use of the unmanned vehicle 3 and/or of a shipment transported by the unmanned vehicle 3.

For example, the determining in step 302 can be carried out according to one or more predetermined rules. For example, corresponding pieces of control information which represent the predetermined rules are stored in memory 11 of the control apparatus.

If particular pieces of sensor information are obtained, the predetermined rules may predetermine that a danger exists, for example. The rules may further predetermine what type of danger it is if it is determined that a danger exists. For example, the rules may predetermine that, if a door opening sensor indicates that the door of the receiving compartment 30 has been opened without the control apparatus being at the recipient address (for example captured by a position sensor) and/or a door opening authorization code previously having been obtained at the control apparatus 1 (for example by means of an input on a user interface of the control apparatus), a danger exists and that the type of danger is possible theft.

Alternatively or additionally, the determining in step 302 can also be carried out according to a pattern recognition algorithm and/or according to a machine learning algorithm, as disclosed above.

If it is determined that a danger exists, the flowchart is continued with a step 304. Otherwise, the flowchart is terminated in a step 303, for example, or is restarted with step 301.

In step 304, a support offer request message is transmitted and/or the transmitting of a support offer request message is caused. For example, the support offer request message is transmitted by the wireless communication interface 13 in the form of a broadcast message.

The support offer request message is configured, for example, to prompt the air drone 4 and the monitoring camera 5 to offer possible support measures for averting the danger in the form of a support offer message when they receive the transmitted support offer request message. For this purpose, the support offer request message contains, for example, pieces of danger information indicative of the location of the danger, the time of the danger and/or the type of danger. On the basis of the pieces of danger information, the air drone 4 and the monitoring camera 5 can determine, for example, whether they can offer a possible support measure for averting the danger. For example, it is possible to predetermine that the monitoring camera 5 is intended to offer a possible support measure only when the location of the danger is capturable by the monitoring camera 5.

In a step 305, at least one first support offer message is received from a first support apparatus in response to the support offer request message and/or the receiving of the first support offer message is caused.

For example, the first support offer message is received in step 305 by the wireless communication interface 13. The first support offer message contains, for example, pieces of support information indicative of the first support measure of the first support apparatus. In this case, the first support measure of the first support apparatus is intended to be understood as meaning, for example, a first support measure which is performable by the first support apparatus.

It goes without saying that, in addition to the first support offer message, yet further support offer messages can be received in step 305 in response to the support offer request message.

It is assumed by way of example below that, in step 305, a first support offer message is received from the air drone 4 and a second support offer message is received from the monitoring camera 5.

The first support offer message from the air drone 4 contains, for example, pieces of support information indicative of a possible support measure of the air drone 4. For example, these pieces of support information may indicate the current position of the air drone 4 and/or the type of possible support measure. The possible support measure of the air drone 4 could be, for example, a hover flight above the unmanned vehicle 3 and video monitoring of the unmanned vehicle 3 from the hover flight position. Accordingly, mobile video monitoring could be indicated, for example, as the type of this possible support measure.

The second support offer message from the monitoring camera 5 may contain, for example, pieces of support information indicative of a possible support measure of the monitoring camera. For example, these pieces of support information may indicate the type of possible support measure. The possible support measure of the monitoring camera 5 could be, for example, video monitoring of the unmanned vehicle 3 and the triggering of an alarm (for example an optical and/or acoustic alarm at the position of the monitoring camera 5 and/or in a monitoring center). Accordingly, stationary video monitoring and an alarm could be indicated, for example, as the type of this possible support measure.

A step 306 determines, at least partially depending on the first support offer message received in step 305, whether a first support measure of the first support apparatus is suitable for averting the danger. The determining in step 306 reveals, for example, that the first support measure is suitable for averting the danger if the first support measure reduces the probability of damage and/or unauthorized use of the unmanned vehicle 3 and/or of a shipment transported by the unmanned vehicle 3.

For example, the determining in step 306 is carried out at least partially depending on pieces of support information contained in the first support offer message and according to one or more predetermined rules. For example, corresponding pieces of control information which represent the predetermined rules are stored in memory 11 of the control apparatus 1.

The predetermined rules may predetermine, for example, whether and under what conditions a support measure is suitable for averting a particular type of danger. In addition to the type of support measure, the position of the support apparatus and/or the time of the support measure may also be taken into account in this case, for example. If the type of danger is possible theft, these rules may predetermine, for example, that both video monitoring and the triggering of an alarm are suitable support measures for averting the threat.

Alternatively or additionally, the determining in step 306 can also be carried out according to a pattern recognition algorithm and/or according to a machine learning algorithm, as disclosed above.

It goes without saying that step 306 can be performed for each of the support offer messages received in step 305 if a plurality of support offer messages were received in step 305. Furthermore, in this case, the various support measures in step 306 can also be weighted according to their suitability for averting the danger, with the result that at least that support measure which is most suitable for averting the danger can be determined on the basis of the weighting. The weighting is obtained, for example, as the result of determining whether the respective support measure is suitable for averting the danger. For example, the weighting corresponds to the probability with which the respective support measure reduces the probability of damage and/or unauthorized use of the protected good.

For the example disclosed above, in which, in step 305, a first support offer message is received from the air drone 4 and a second support offer message is received from the monitoring camera 5, step 306 determines, for example, that both the possible support measure of the air drone 4 (that is to say a hover flight above the unmanned vehicle 3 and video monitoring of the unmanned vehicle 3) and the possible support measure of the monitoring camera 5 (that is to say video monitoring of the unmanned vehicle 3 and the triggering of an alarm) are suitable for averting the danger (for example possible theft).

If it is determined that the first support measure (for example one of the various support measures if a plurality of support offer messages were received in step 305) is suitable for averting the danger, the flowchart is continued with a step 308. Otherwise, the flowchart is terminated in step 307, for example, or is restarted with step 301.

The first support measure is prompted in step 308. It goes without saying that a plurality or all of the various support measures can also be prompted in step 308 if a plurality of support offer messages were received in step 305. For example, it may be predetermined that all support measures or all support measures with a particular minimum weighting are prompted if the support measures are weighted in step 306.

The prompting of a support measure is intended to be understood as meaning, for example, that the control apparatus 1 prompts a support apparatus to perform this support measure. For example, the control apparatus 1 can transmit a support request message to the support apparatus, which support request message is configured to prompt the support apparatus to perform this support measure.

As disclosed above, a support request message may contain support authorization information which is configured to verify authorization of the control apparatus 1 to request support (for example with respect to support apparatuses which belong to and/or are operated by the same organization and/or the same company as the control apparatus). A support apparatus performs a support measure, for example, only when the control apparatus 1 can verify corresponding authorization.

For the example disclosed above, in which, in step 305, a first support offer message is received from the air drone 4 and a second support offer message is received from the monitoring camera 5, step 308 transmits, for example, a support request message to the air drone 4 in order to prompt the support measure of the air drone 4 (that is to say a hover flight above the unmanned vehicle 3 and video monitoring of the unmanned vehicle 3) and transmits a support request message to the monitoring camera 5 in order to prompt the support measure of the monitoring camera 5 (that is to say video monitoring of the unmanned vehicle 3 and the triggering of an alarm).

In an optional further step, further pieces of sensor information may be obtained and it is possible to determine, at least partially depending on these further pieces of sensor information, whether the dangers still exists. If it is revealed that the danger no longer exists, stopping of the support measure(s) prompted in step 308 is prompted, for example. Otherwise, step 304, for example, is repeated in order to be able to possibly prompt further support measures.

Provision may further be made for pieces of documentation information for documenting the danger and/or the averting of the danger to be stored in memory 11 of the control apparatus 1. The pieces of documentation information contain, for example, pieces of sensor information obtained by the sensors 14 and/or pieces of information received from one or more support apparatuses (for example pieces of video monitoring information from the air drone 4 and from the monitoring camera 5).

Figure 4:
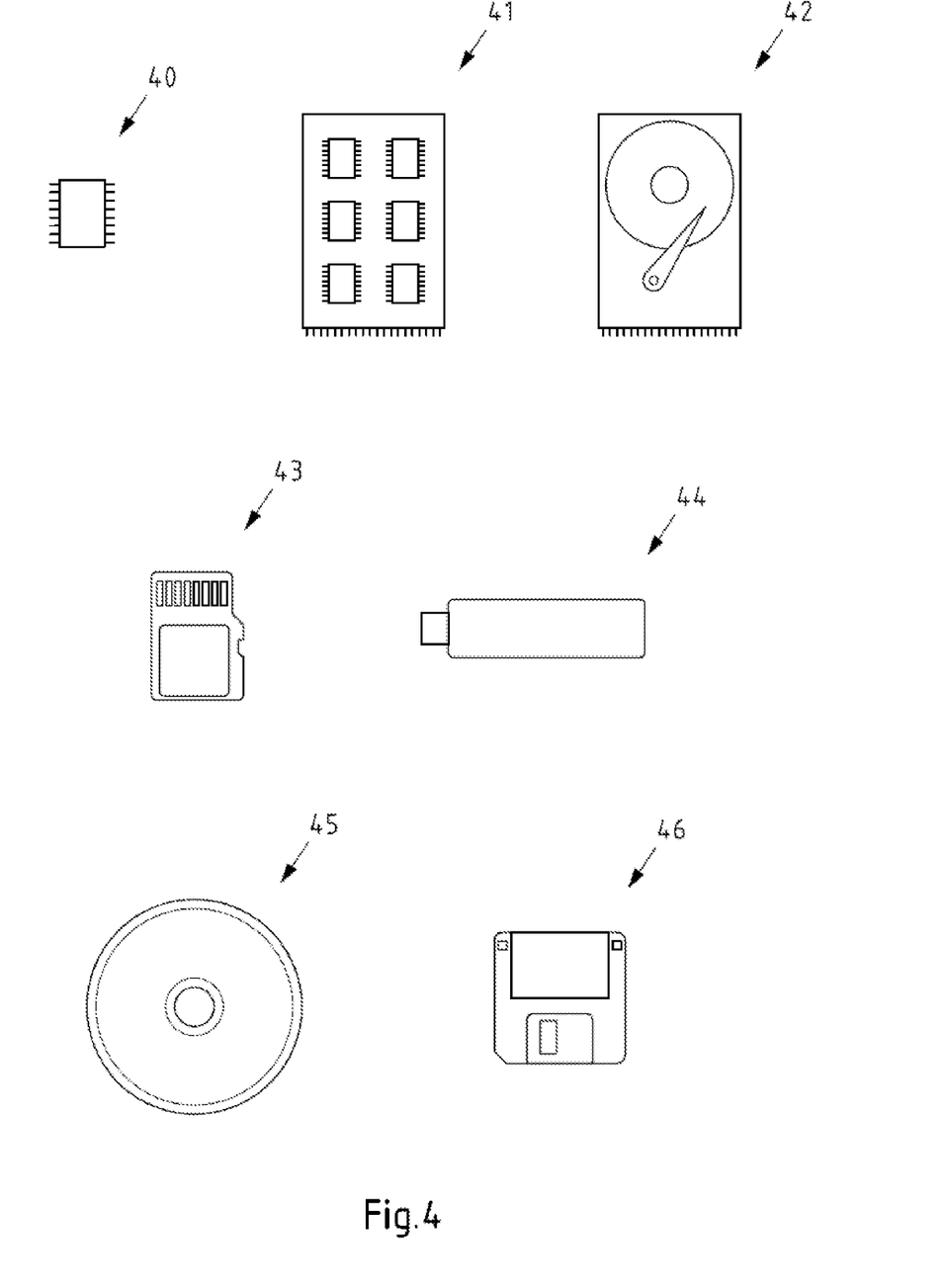
FIG. 4 shows exemplary embodiments of storage media.

FIG. 4 finally shows exemplary embodiments of storage media on which an exemplary embodiment of a computer program according to the invention can be stored. The storage medium may be, for example, a magnetic, electrical, optical and/or other storage medium. The storage medium may be, for example, part of a processor (for example the processor 10 in FIG. 1), for example a (non-volatile or volatile) program memory of the processor or a part thereof (for example memory 11 in FIG. 1). Exemplary embodiments of a storage medium are a flash memory 40, an SSD hard disk 41, a magnetic hard disk 42, a memory card 43, a memory stick 44 (for example a USB stick), a CD-ROM or DVD 45 or a floppy disk 46.

All references, including publications, patent applications, and patents cited herein are hereby incorporated by reference to the same extent as if each reference were individually and specifically indicated to be incorporated by reference and were set forth in its entirety herein.

The exemplary embodiments of the present invention described in this specification are also intended to be understood as having been disclosed in all combinations with one another. In particular, the description of a feature included in an embodiment—unless explicitly stated to the contrary—is also not intended to be understood in the present case as meaning that the feature is indispensable or essential to the function of the exemplary embodiment. The sequence of the method steps described in this specification in the individual flowcharts is not compulsory and alternative sequences of the method steps are conceivable, unless indicated otherwise. The method steps can be implemented in various ways; an implementation in software (by means of program instructions), hardware or a combination of both is therefore conceivable for implementing the method steps.

Terms used in the patent claims such as "comprise", "have", "contain", "include" and the like do not exclude further elements or steps. The wording "at least partially" includes both the case of "partially" and the case of "completely". The wording "and/or" is intended to be understood as meaning the fact that both the alternative and the combination are intended to be disclosed, that is to say "A and/or B" means "(A) or (B) or (A and B)". In the context of this specification, a plurality of units, persons or the like means several units, persons or the like. The use of the indefinite article does not exclude a plurality. An individual device may perform the functions of a plurality of units or devices mentioned in the patent claims. Reference symbols stated in the patent claims should not be considered as restrictions of the means and steps used.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for averting a danger or for prompting the averting of a danger, wherein the method is performed by a control apparatus, wherein the control apparatus is part of an unmanned vehicle, and wherein the method comprises:
    obtaining a plurality of pieces of sensor information;
    determining, at least depending on the obtained pieces of sensor information, whether a danger exists,
    wherein it is determined that the danger exists if there is a particular probability of one of damage or unauthorized use of at least one of the unmanned vehicle or a shipment transported by the unmanned vehicle;
    transmitting or causing the transmitting of a support offer request message if it is determined that the danger exists;
    receiving or causing the receiving of at least one first support offer message from a first support apparatus in response to the support offer request message;
    determining, at least depending on the received first support offer message, whether a first support measure of the first support apparatus is suitable for averting the danger; and
    prompting the first support measure if it is determined that the first support measure is suitable for averting the danger.

2. The method according to claim 1, wherein the support offer request message contains pieces of danger information relating to the danger and wherein the support offer message contains pieces of support information relating to a possible support measure of the first support apparatus.

3. The method according to claim 1, wherein the first support apparatus is different from the control apparatus or is at least partially autonomous or a combination thereof.

4. The method according to claim 1, wherein the prompting of the first support measure comprises transmitting or causing the transmitting of a support request message to the first support apparatus.

5. The method according to claim 1, wherein the method comprises:
    receiving or causing the receiving of at least one second support offer message from a second support apparatus in response to the support offer request message;
    determining, at least partially depending on the received second support offer message, whether a second support measure of the second support apparatus is suitable for averting the danger; and
    prompting the second support measure if it is determined that the second support measure is suitable for averting the danger.

6. The method of claim 1, wherein the unmanned vehicle is an aircraft.

7. A control apparatus, wherein the control apparatus is part of an unmanned vehicle and wherein the control apparatus comprises at least one processor and at least one memory containing program instructions, wherein the at least one memory and the program instructions are configured, together with the at least one processor, to cause the control apparatus to perform:
    obtaining a plurality of pieces of sensor information;
    determining, at least depending on the obtained pieces of sensor information, whether a danger exists,
    wherein it is determined that the danger exists if there is a particular probability of one of damage or unauthorized use of at least one of the unmanned vehicle or a shipment transported by the unmanned vehicle;
    transmitting or causing the transmitting of a support offer request message if it is determined that the danger exists;

receiving or causing the receiving of at least one first support offer message from a first support apparatus in response to the support offer request message;

determining, at least depending on the received first support offer message, whether a first support measure of the first support apparatus is suitable for averting the danger; and prompting the first support measure if it is determined that the first support measure is suitable for averting the danger.

8. The control apparatus according to claim 7, wherein the pieces of sensor information originate from one or more of the following sensors: a temperature sensor, a pressure sensor, a brightness sensor, a motion sensor, an acoustic sensor, an ultrasonic sensor, an optical sensor, an infrared sensor, a light sensor, an image sensor, a video sensor, a chemical sensor, a glass breakage sensor, a motion sensor, a radio sensor, a position sensor, a door or window opening sensor or an acceleration sensor.

9. The control apparatus according to claim 7, wherein the determining whether a danger exists is carried out according to one or more predetermined rules or according to a pattern recognition algorithm or according to a machine learning algorithm or a combination thereof.

10. The control apparatus according to claim 7, wherein the support offer request message contains pieces of danger information relating to the danger.

11. The control apparatus according to claim 7, wherein the support offer message contains pieces of support information relating to a possible support measure of the first support apparatus.

12. The control apparatus according to claim 7, wherein the determining whether the first support measure is suitable for averting the danger is carried out according to one or more predetermined rules or according to a pattern recognition algorithm or according to a machine learning algorithm or a combination thereof.

13. The control apparatus according to claim 7, wherein the first support apparatus is different from the control apparatus or is at least partially autonomous or a combination thereof.

14. The control apparatus according to claim 7, wherein the prompting of the first support measure comprises transmitting or causing the transmitting of a support request message to the first support apparatus.

15. The control apparatus according to claim 14, wherein the support offer request message or the support request message contain(s) support authorization information.

16. The control apparatus according to claim 7, wherein the at least one memory and the program instructions are further configured, together with the at least one processor, to cause the apparatus to perform:

receiving or causing the receiving of at least one second support offer message from a second support apparatus in response to the support offer request message;

determining, at least partially depending on the received second support offer message, whether a second support measure of the second support apparatus is suitable for averting the danger; and prompting the second support measure if it is determined that the second support measure is suitable for averting the danger.

17. The control apparatus according to claim 7, wherein, if a plurality of support offer messages are received from different support apparatuses in response to the support offer request message and if it is determined that a plurality of support measures of the various support apparatuses are suitable for averting the danger, at least one support measure of the various support apparatuses is prompted.

18. The control apparatus according to claim 7, wherein the at least one memory and the program instructions are further configured, together with the at least one processor, to cause the apparatus to perform:

storing or prompting the storing of pieces of documentation information for documenting the danger or the averting of the danger.

19. The control apparatus according to claim 7, wherein the at least one memory and the program instructions are further configured, together with the at least one processor, to cause the apparatus to perform:

obtaining further pieces of sensor information; and determining, at least partially depending on the obtained further pieces of sensor information, whether the danger still exists.

20. The control apparatus according to claim 7, wherein the control apparatus is part of an unmanned vehicle or a building automation system or an alarm system or a combination thereof.

21. A non-transitory computer readable storage medium including a computer program comprising program instructions which are configured, when executed by at least one processor, to cause a control apparatus that is part of an unmanned vehicle to perform:

obtaining a plurality of pieces of sensor information;

determining, at least depending on the obtained pieces of sensor information, whether a danger exists, wherein it is determined that the danger exists if there is a particular probability of one of damage or unauthorized use of at least one of the unmanned vehicle or a shipment transported by the unmanned vehicle;

transmitting or causing the transmitting of a support offer request message if it is determined that the danger exists;

receiving or causing the receiving of at least one first support offer message from a first support apparatus in response to the support offer request message;

determining, at least depending on the received first support offer message, whether a first support measure of the first support apparatus is suitable for averting the danger; and prompting the first support measure if it is determined that the first support measure is suitable for averting the danger.

\* \* \* \* \*